May 24, 1949.    O. JENSEN    2,471,216
LOW-VOLTAGE RECTIFIER PROTECTION
Filed Oct. 18, 1945
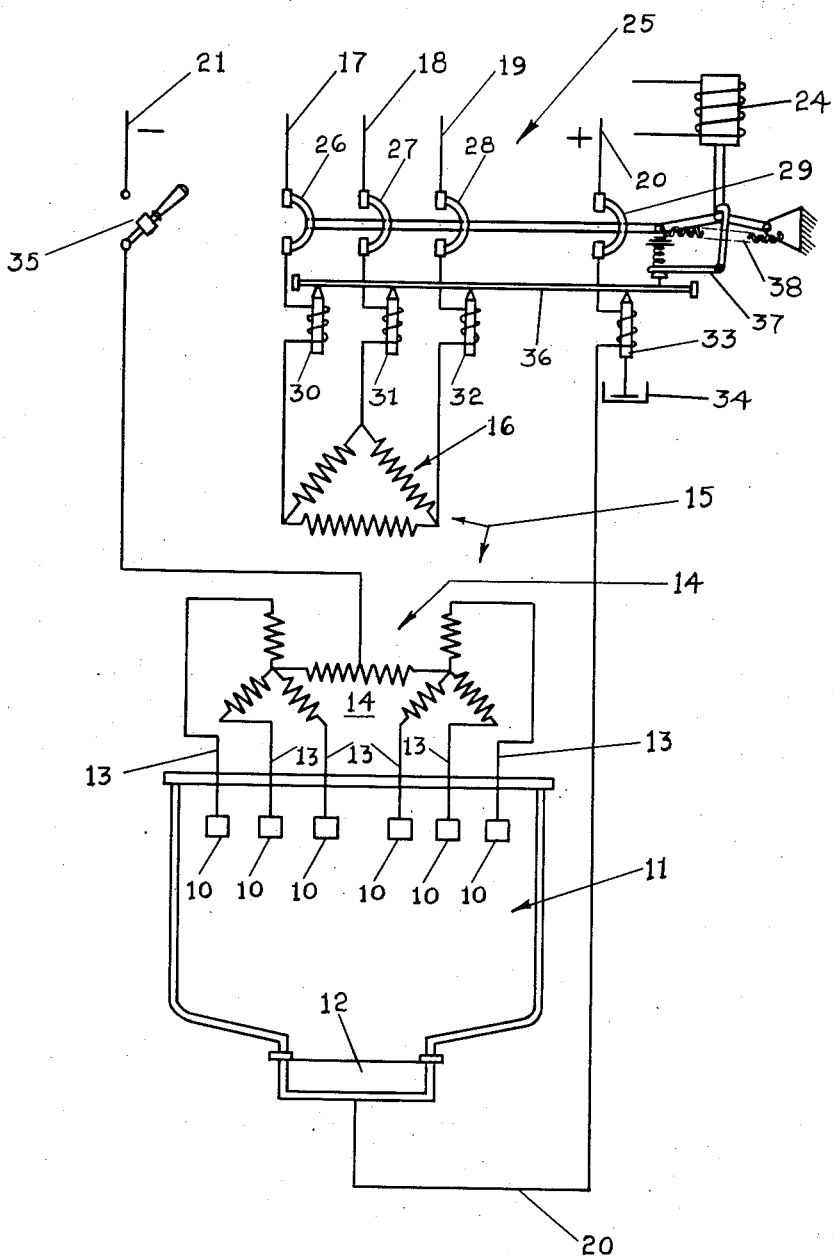
INVENTOR.
Otto Jensen
BY
Ostrolenk + Faber
ATTORNEYS Patented May 24, 1949

2,471,216

UNITED STATES PATENT OFFICE 2,471,216

LOW-VOLTAGE RECTIFIER PROTECTION

Otto Jensen, Malvern, Pa., assignor to I-T-E Circuit Breaker Company, Philadelphia, Pa., a corporation of Pennsylvania Application October 18, 1945, Serial No. 623,109

3 Claims. (Cl. 321—12)

My present invention relates to circuit interrupters and more particularly to a method for the utilization of a single circuit interrupter for full protection and isolation of mercury arc rectifier circuits.

In a mercury arc rectifier circuit used for instance for furnishing direct current to a number of electrolytic cells in the manufacture of metals, such as aluminum or magnesium, it is desirable on the occurrence of fault conditions that the anode and cathode sides of the mercury arc rectifier be immediately and simultaneously opened.

In such mercury arc rectifier circuits, the anode side is fed from a three-phase A. C. line connected to the delta connected primary of a transformer. The mercury arc rectifier often is a six-phase unit fed from a six-phase secondary of the transformer.

I have found that full protection of the entire circuit may be obtained by the use of a four-pole circuit breaker, three of the poles of which are connected in the three-phase alternating current feeder and the fourth pole of which is connected on the cathode side of the mercury arc rectifier.

These four poles of the single circuit breaker are operated to open and closed positions simultaneously. Each of the four poles has its individual series connected overcurrent trip device connected in series in the particular conductor in which the circuit breaker pole is connected. Thus any of the series trip coils may be individually adjusted to respond to a predetermined condition in the conductor in which it is connected and operation of the trip coil in response to that condition will trip the entire circuit breaker, opening all four poles simultaneously.

This arrangement of a four pole breaker is particularly applicable where the A. C. input voltage and the D. C. output voltage are approximately the same. For instance where the A. C. voltage is 440 volts and the D. C. voltage is 275 volts. In this case the requirements of the circuit breaker poles for A. C. are similar to the pole for D. C. and can be made alike as to size and spacing.

By thus arranging the poles of the circuit breaker so that three of the poles are in the three-phase alternating current line before the transformer and so that the fourth pole is in the cathode lead of the mercury arc rectifier, full protection of the entire circuit is obtained.

Thus the trip coils connected in the A. C. line will respond to short circuit in the transformer, backfires, as well as to short circuits on the cathode side of the rectifier. The pole connected on the cathode side of the rectifier will also respond to short circuits on that side of the rectifier but may additionally be provided with a suitable time delay device permitting temporary overloads of limited magnitude to occur, but nevertheless protecting the rectifier against overload. The type of circuit breaker preferably used for this purpose is the type shown in Patent Nos. 2,311,690 and 2,311,710.

The circuit breaker shown in these patents is a three-pole circuit breaker but it is pointed out therein that the same device may be built as a four pole circuit breaker and the device shown in those patents built as a four pole circuit breaker will perform the functions required by my invention.

It will be obvious that where the A. C. feeder is any other than a three phase circuit, an appropriate number of poles may be used in accordance with the number of conductors in the feeder, the circuit breaker being provided with the one extra pole for the cathode side of the rectifier.

Accordingly a primary object of my invention is the provision of simplified and novel circuit interrupting means connected in a novel manner to fully protect a mercury arc rectifier circuit.

Another object of my invention is the provision of a single multi-pole circuit breaker for protection of a mercury arc rectifier circuit wherein each of the feeders on the A. C. side of the transformer feeding the rectifier is protected by three poles of the circuit breaker and wherein the cathode on the positive side of the rectifier is also protected by one of the poles of the same circuit breaker.

The foregoing and many other objects of my invention will become apparent in the following description and drawing in which:

The figure shows a schematic circuit diagram illustrating the manner in which a single four pole circuit breaker may be utilized and connected in accordance with my invention to protect a complete mercury arc rectifier circuit.

The anodes 10 of the mercury arc rectifier 11 which has the mercury pool 12 are each connected to the conductors 13 which in turn are connected to a six phase secondary 14 of the transformer 15. The three phase delta connected primary 16 on transformer 15 is fed from the three phase alternating current line comprising the conductors 17, 18, 19. The cathode side of the mercury arc rectifier 11 is connected to the conductor 20. The D. C. apparatus which is operated through the rectifier circuit is connected across the cathode conductor 20 and the negative or ground conductor 21, which latter conductor is connected to the mid-point of the six-phase secondary 14 of transformer 15.

A single circuit interrupter 25 is provided with poles 26, 27, 28, 29. The contacts of pole 26 are in series in conductor 17; the contacts of pole 27 are in series in conductor 18; the contacts of pole 28 are in series in conductor 19; and the contacts of pole 29 are in series in conductor 20. As previously pointed out, the individual poles 26, 27, 28, 29 are part of a single circuit breaker and are operated simultaneously by the solenoid coil 24.

The circuit breaker may have the form shown in Patents Nos. 2,311,690 and 2,311,710 but is a four pole circuit breaker in my invention. Each of the poles 26 to 29 is provided with an over-current trip coil 30, 31, 32, 33, respectively, so that the circuit breaker will trip in response to the condition of each of the lines 17 to 19 and the cathode conductor 20.

Operation, due to circuit conditions, of any of the trip coils 30 to 33, will rotate the tripper bar 36 and release the latch 37. The spring 38 functions to open all four poles simultaneously. The breaker 25 is reclosed by the energization of the solenoid 24.

The trip coils 30 to 32 are calibrated to trip instantaneously at between 3 and 6 times the normal A. C. input and, as above pointed out, on operation of any of these three trip coils, the entire four pole circuit breaker will open.

Thus, it will be seen that instantaneous tripping will follow on any fault condition that may occur on the load side of the A. C. circuit breaker poles 26, 27, and 28. These faults may occur in the transformer windings or leads, at the rectifier terminals or beyond the rectifier in the D. C. circuit. A backfire of the rectifier which is a flash-over inside the rectifier from one of the anodes 10 to an adjacent anode is a short circuit on one phase of the transformer and will draw fault current in at least one of the poles 26, 27 or 28 and result in instantaneous tripping of the breaker.

Any condition which causes the tripping of the poles 26, 27 or 28, also opens pole 29 and gives complete isolation of the rectifier and transformer. The high setting of the trip coils 30 to 32 is to prevent tripping on overloads that occur on momentary conditions such as the starting of a motor.

Overload protection is provided by the coil 33 in the pole 29.

Accordingly, these trip coils 30 to 32 protect the entire circuit against short circuit in the transformer, backfires in the rectifier, and short circuits on the cathode or D. C. side of the rectifier.

The trip coil 33 of the D. C. pole 29 connected in the cathode conductor 20 should be supplied with an appropriate time delay device 34 for instance of the type shown in Patents No. 2,390,735, No. 2,348,228 and No. 2,375,328 and may be calibrated from 100 to 200% of the normal D. C. output.

Thus, on the occurrence of temporary overloads for a period of time less than the time delay of the overload device, the trip coil 33 will not operate. The time delay device 34 is, however, so constructed as is well known in the art, that on the continuation of such an overload beyond a predetermined time interval, operation of the trip coil 33 will occur to trip the entire breaker and open all the poles.

Thus the trip coil 33 protects against overload of the rectifier while providing appropriate time delay to prevent false operation on temporary loads in excess of the normal D. C. output of the rectifier.

It will be evident that the pole 29 may be equipped with any of the protective features well known in the art such as under-voltage, reverse current, rate of rise current trip or many others. The poles 26, 27 and 28 may also be equipped with any of the protective features commonly used for A. C. circuits such as under-voltage, reverse power and many others. Thus, if two rectifiers are operating in parallel and there is the possibility of one of them feeding back to the other due, for instance, to loss of A. C. voltage on it, then the pole 29 may be equipped with a reverse current trip device to give the desired protection.

The use of additional tripping devices is dependent on the type of protection required for the particular circuits and method of operation.

By the means herein described therefore, the utilization of a single circuit breaker, one pole of which is connected in the cathode or output conductor of the rectifier and the other pole of which is connected in the A. C. feeders on the feed side of the transformer, will provide a positive protection for all of the elements of the rectifier set.

The entire rectifier unit will be protected with respect to overcurrents or short circuits in the transformer, the rectifier, and the D. C. load as well as against backfires in the rectifier.

On the occurrence of any of these conditions, the entire mercury arc rectifier set will immediately be isolated on both sides, by the tripping of circuit breaker 25, both from the line and the load.

A switch 35 is some times used to isolate the rectifier from the negative lead for maintenance. This is particularly true if more than one source is feeding the D. C. side or if the negative lead is ungrounded.

I claim:

1. In a rectifier circuit comprising a plurality of alternating current conductors connected to the primary of a transformer, a rectifier having an anode connected to the secondary of the transformer and a cathode connected to a direct current conductor; a protective device comprising a multipole circuit breaker; the poles of the circuit breaker being simultaneously operable to open and closed position; one of the poles of the circuit breaker being connected in the direct current conductor; and being calibrated for time delay in response to overloads; and the other poles of the circuit breaker being connected in the alternating current conductors, each pole of the circuit breaker having a tripping device energized by the conductor in which the pole is connected; each of the tripping devices energized by the alternating current conductors being calibrated for instantaneous trip at a predetermined current level.

2. In a rectifier circuit comprising a plurality of alternating current conductors connected to the primary of a transformer, a rectifier having an anode connected to the secondary of the transformer and a cathode connected to a direct current conductor; a protective device comprising a multipole circuit breaker, the poles of the circuit breaker being simultaneously operable to open and closed position; one of the poles of the circuit breaker being connected in the direct current conductor; and the other poles of the circuit breaker being connected in the alternating current conductors, each pole of the circuit breaker having a tripping device energized by the conductor in which the pole is connected; the tripping device in the direct current conductor being provided with time delay means for a delayed trip in response to predetermined current conditions up to a predetermined value continuing over a predetermined time interval and tripping instantaneously at current conditions above said predetermined value.

3. In a rectifier circuit comprising a plurality of alternating current conductors connected to the primary of a transformer, a rectifier having an anode connected to the secondary of the transformer and a cathode connected to a direct current conductor; a protective device comprising a multipole circuit breaker, the poles of the circuit breaker being simultaneously operable to open and closed position; one of the poles of the circuit breaker being connected in the direct current conductor; and the other poles of the circuit breaker being connected in the alternating current conductors, each pole of the circuit breaker having a tripping device energized by the conductor in which the pole is connected; each of the tripping devices energized by the alternating current being calibrated for instantaneous trip at a predetermined current level; the tripping device in the direct current conductor being provided with time delay means for a delayed trip in response to predetermined current conditions up to a predetermined value continuing over a predetermined time interval and tripping instantaneously at current conditions above said predetermined value.

OTTO JENSEN.

REFERENCES CITED

The following references are of record in the file of this patent:

UNITED STATES PATENTS

| Number | Name | Date |
|---|---|---|
| 1,717,312 | Brown et al. | June 11, 1929 |
| 1,748,451 | Jonas | Feb. 25, 1930 |
| 1,817,084 | Keller | June 14, 1932 |
| 1,837,995 | Prince | Dec. 22, 1931 |
| 1,863,162 | Keller | Aug. 4, 1931 |
| 1,966,810 | Burnham | July 17, 1934 |
| 2,056,610 | Leuthold | Oct. 6, 1936 |
| 2,193,083 | Winograd | Mar. 12, 1940 |
| 2,285,634 | Issendorff et al. | June 9, 1942 |

FOREIGN PATENTS

| Number | Country | Date |
|---|---|---|
| 127,291 | Austria | Mar. 10, 1932 |